Oct. 19, 1948. B. W. MANTLE 2,451,683
COUPLING
Filed Jan. 8, 1944 3 Sheets-Sheet 1
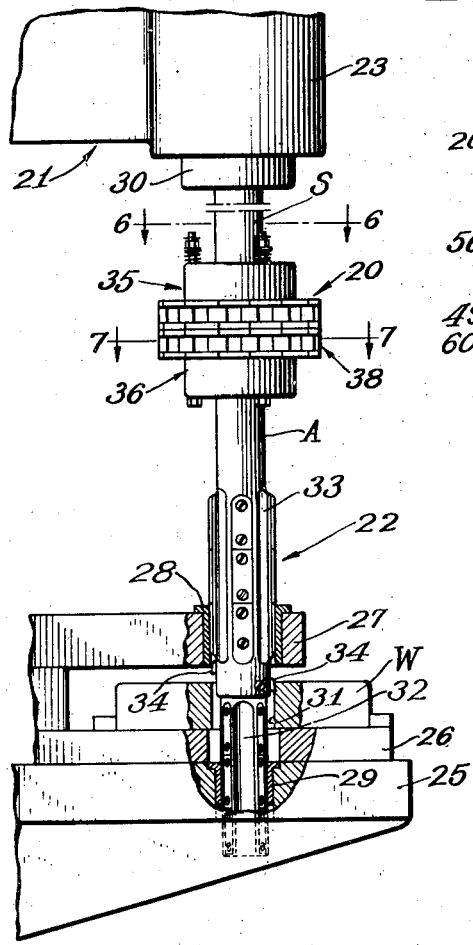
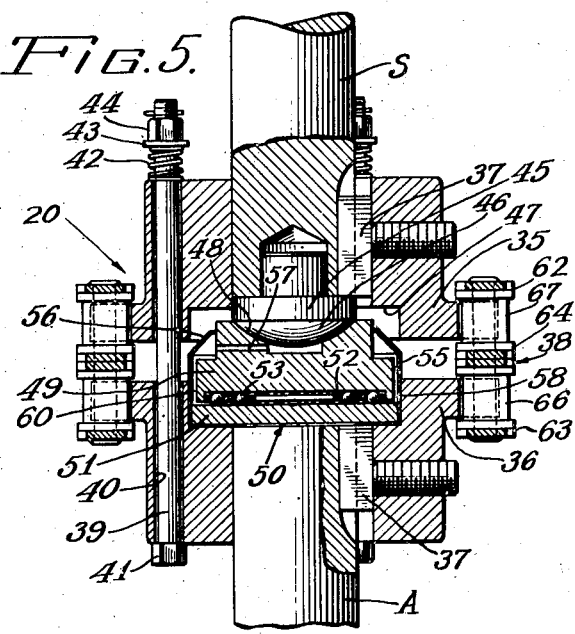
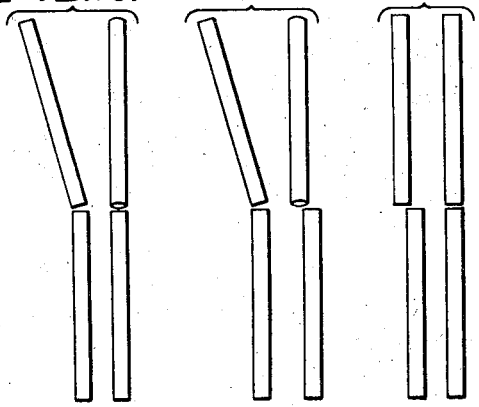
Inventor:
Burr W. Mantle
By Wallace and Cannon
Attorneys Oct. 19, 1948. B. W. MANTLE 2,451,683
COUPLING
Filed Jan. 8, 1944 3 Sheets-Sheet 2
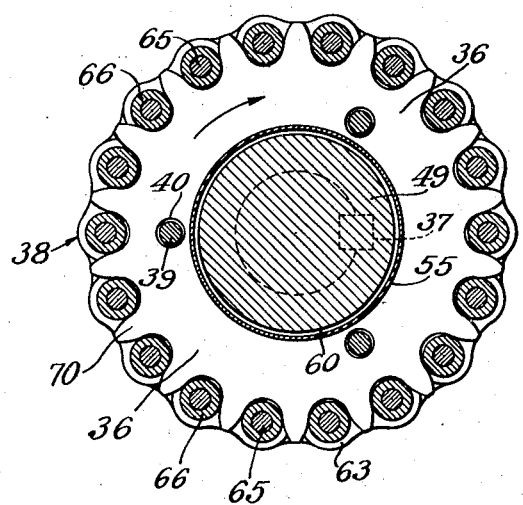
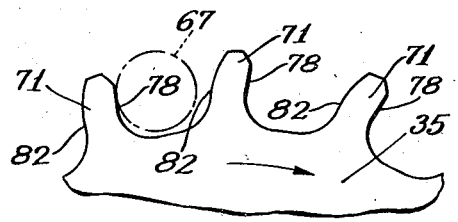
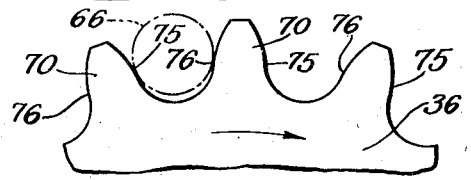
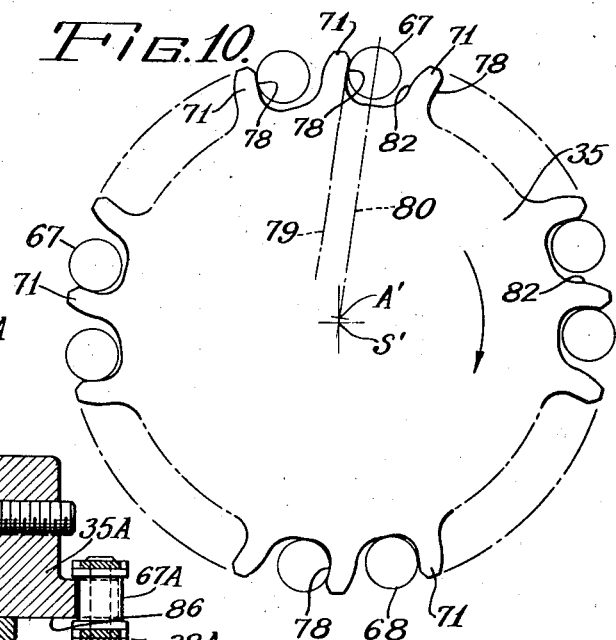
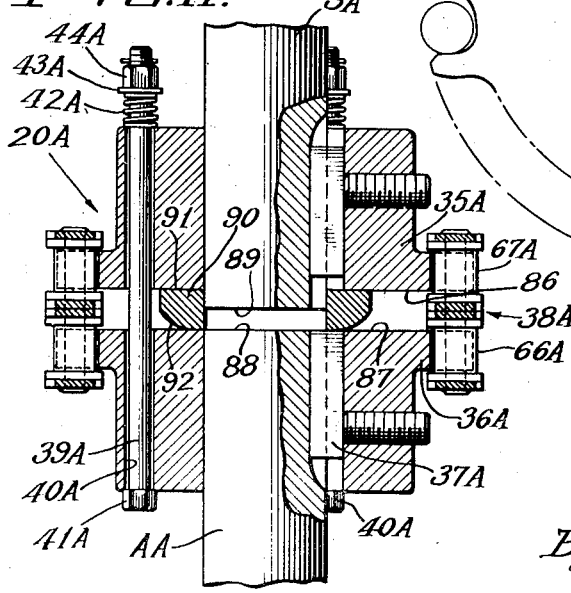
Inventor:
Burr W. Mantle
By Wallace and Cannon
Attorneys Oct. 19, 1948.  B. W. MANTLE  2,451,683
COUPLING
Filed Jan. 8, 1944  3 Sheets-Sheet 3
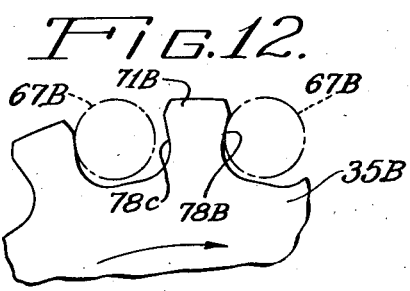
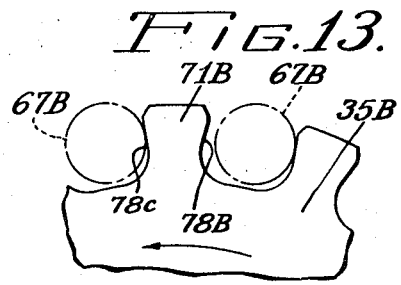
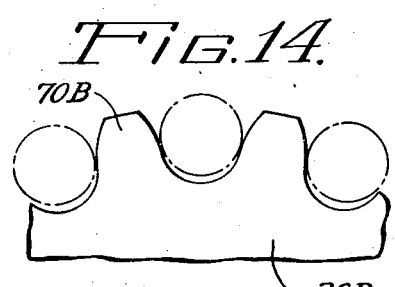
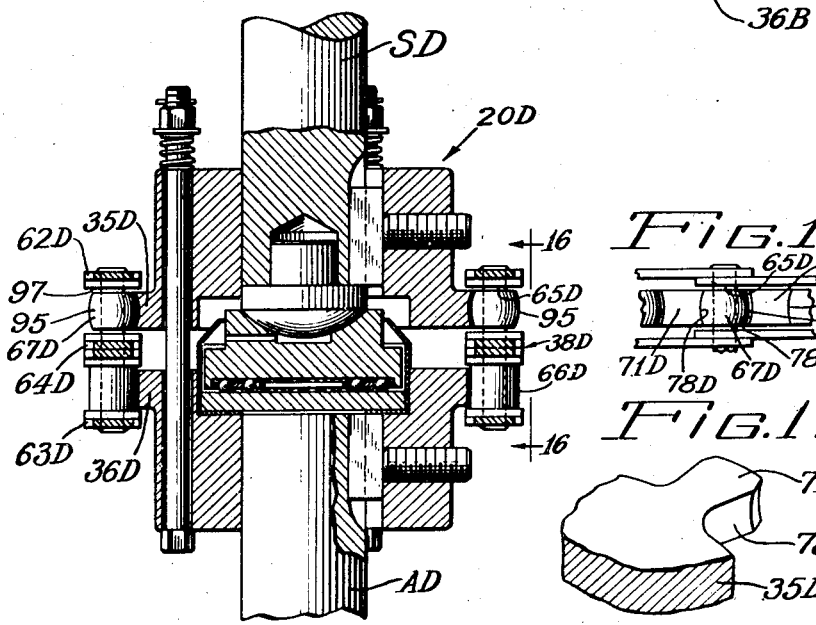
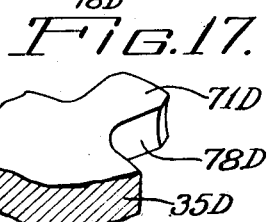
Inventor:
Burr W. Mantle
By Wallace and Cannon
Attorneys Patented Oct. 19, 1948

2,451,683

UNITED STATES PATENT OFFICE 2,451,683

COUPLING

Burr W. Mantle, Pittsford, N. Y., assignor to American Brake Shoe Company, Wilmington, Del., a corporation of Delaware Application January 8, 1944, Serial No. 517,486

3 Claims. (Cl. 64—19)

This invention relates to couplings and particularly to flexible couplings of the character used between the adjacent ends of rotary members for transmitting rotary motion from one of the members to the other.

Adjacent ends of rotary members are often interconnected by universal couplings which are arranged to function properly so long as the rotary axes of two such members intersect with each other. In most instances such a situation will prevail but under some circumstances, the aforesaid relationship of the two rotary members will not prevail and in such circumstances a universal joint or coupling of the usual kind cannot be employed without imparting undue stress to the elements of the coupling or to the bearing or guide means which support one or the other of the two members.

In those situations where ordinary universal joints or couplings may be satisfactorily employed, the axes of the two rotary members or shafts are disposed in a common plane at all times and the universal coupling serves to transmit the desired rotary movement from one of the members to the other member even though the axes of the two rotary members may be displaced in such plane so as to be angularly disposed with respect to each other. In other instances, however, the shafts may be so related that their axes are disposed in parallel planes that are spaced laterally from each other, and in such instances, the ordinary universal coupling cannot accomplish the desired transmission of rotary motion between the shafts without applying undesired stress to the bearing or guiding means which support one or the other of the two shafts. When the axes of the two shafts are disposed in parallel but laterally offset planes, such axes may be parallel to each other, or may be disposed at an angle to each other, but in either event, the situation cannot be cared for by universal couplings of the usual kind.

In view of the foregoing, it is an important object of the present invention to enable rotary motion to be transmitted between rotary elements disposed in any of the relationships hereinabove discussed, and an object relative to the foregoing is to enable this to be done without applying objectionable stresses to the parts of the couplings or to the supporting or bearing means which maintain the two rotary elements in position in a lateral sense.

Misalignment of rotary members or shafts may occur, for example, in various kinds of machine tools such as boring machines and drills. In such a machine the work is ordinarily supported in a workholder with a jig or fixture disposed over the work so as to receive and properly position and align the tool which is to operate upon the work which is thus clamped. Such a tool is carried and rotated by a longitudinally movable tool spindle, and under ideal circumstances of mounting and adjustment, such spindle and the tool would be in perfect alignment with each other and in perfect alignment with the guide bushing means of the jig or fixture. Under such perfect conditions, the desired bore formed in the work piece would be properly located in a lateral sense and would extend in the proper direction through the work. In practice, however, it is found that the attainment of such a perfect and ideal alignment and relationship of the tool and the spindle with relation to each other and with relation to the axis of the guide bushing or bushings can be obtained only in very rare instances. It is, therefore, a further object of the present invention to enable the proper location of the bore in a work piece to be attained even though the relationship of the tool to the spindle may be at variance with the perfect adjustment or relationship hereinabove described. An object related to the foregoing is to enable such results to be obtained in such a manner that objectionable stress or wear upon the guide bushings or upon the bearings of the tool spindle may be avoided, thereby to insure a long useful life in the machine tool as well as in the jigs and parts thereof.

Other and further objects of the present invention will be apparent from the following description and claims and are illustrated in the accompanying drawings which, by way of illustration, show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is a side elevational view of a coupling of the invention and showing the same mounted in a machine tool;

Figs. 2, 3, and 4 are diagrammatic views illustrating different forms of misalignment which may be cared for by the coupling of the present invention;

Fig. 5 is a vertical sectional view of the coupling shown in Fig. 1;

Fig. 6 is a plan section taken substantially along the line 6—6 on Fig. 1;

Fig. 7 is a plan section taken substantially along the line 7—7 on Fig. 1;

Fig. 8 is a fragmentary plan view illustrating the form of the teeth of the driving sprocket of the coupling;

Fig. 9 is a fragmentary plan view illustrating the form of the teeth of the driven sprocket of the coupling;

Fig. 10 is a diagrammatic plan view illustrating the relationship between the driving sprocket and the elements of the chain when there is misalignment between the connected rotary members;

Fig. 11 is a vertical sectional view illustrating an alternative embodiment of the invention;

Fig. 12 is a fragmental view similar to Fig. 10 and showing an alternative embodiment of the invention adapted to transmit rotation in either direction;

Fig. 13 is a view similar to Fig. 12 and showing the parts in different positions;

Fig. 14 is a fragmental view similar to Fig. 7 and showing a sprocket adapted for use in a coupling with the sprocket shown in Fig. 12;

Fig. 15 is a vertical sectional view similar to Fig. 5 and showing another alternative form of the invention;

Fig. 16 is a sectional view taken along the line 16—16 of Fig. 15; and

Fig. 17 is a fragmental perspective view of one of the teeth of one the sprockets shown in Fig. 15.

The coupling 20 of the present invention as shown in Figs. 1, and 5 to 10, inclusive, of the accompanying drawings, is included in a fragmentally illustrated machine tool 21 intermediate the tool spindle S and the tool or boring bar 22. The machine tool 21 in which the coupling of the present invention is herein illustrated is a vertical drill press but it will be understood that the coupling of the present invention may be utilized for other purposes and in other kinds of machines or machine tools.

The illustrated machine tool or drill press 21 includes a head 23 disposed above and in spaced relation with respect to a table or bed 25 on which the work W is secured by a work fixture 26 which clamps and accurately locates the work W beneath an overlying jig 27 mounted on the machine tool. The jig 27 has a guide bushing 28 extended therethrough in proper alignment with the desired location at which a bore is to be formed by the boring bar or tool 22, the bushing 28, of course, being aligned as closely as possible with the spindle S and the base of the work fixture has a bushing 29 mounted therein in alignment with the bushing 28 so as to cooperate therewith in guiding the boring bar or tool 22. The spindle S is mounted in a spindle housing or quill 30 which is adapted for vertical reciprocation toward and away from the work W, and during such reciprocation, the spindle S is, of course, driven in the proper direction to cause the tool 22 to produce the required bore in the work. In associating the spindle S with the tool 22, the coupling 20 is secured on the lower end of the spindle S, and as herein shown, the tool 22 has an upper arbor portion A secured to the lower portion of the coupling 20.

The tool or boring bar 22 as herein shown is used to finish bore a rough bore 31 formed in the work piece W, and to accurately guide the boring bar 22 in its operative movement, it is formed with a lower or leading pilot portion 32 which passes through and cooperates with the guide bushing 29, and is also formed with an upper or trailing pilot portion 33 which passes through and cooperates with the upper guide bushing; and with this arrangement the boring action is attained by cutters 34 fixed on the boring bar intermediate the two pilot portions 32 and 33. Thus the boring bar 22 is rotated upon an axis which is accurately determined through the cooperative action of the two bushings 28 and 29 and the pilot portions 32 and 33 of the boring bar.

In the event that the axis of the boring bar as defined by the bushings 28 and 29 and the axis of the spindle S are in perfect alignment, the desired boring or other operation may be performed without unusual or undesired stresses in the various parts of the mechanism, but in practice it is found that such perfect alignment of the bushings, and the spindle is very rarely attained. The misalignment which arises in practice may take different forms. Thus, as illustrated diagrammatically in Fig. 2, one form of misalignment, which may be termed angular misalignment, positions the axes of the two related elements in a common plane but at an angle to each other in this common plane. Another form of misalignment is illustrated in Fig. 4 of the drawings, and as there shown, the axes of the two related elements are parallel to each other but are disposed in laterally spaced planes. Such misalignment may be termed lateral misalignment. There may of course be another form of misalignment such as that shown in Fig. 3 of the drawings, and it will be evident that such misalignment is a combination of the angular misalignment of Fig. 2 and the lateral misalignment of Fig. 4. In accordance with the present invention, any of the three forms of misalignment which have thus been illustrated may be cared for by the coupling 20, and this is attained in such a way that undesired stresses on the various parts of the mechanism are avoided.

In the preferred form of the invention, the coupling 20, as shown in Figs. 1 and 5 to 10, comprises a pair of sprockets 35 and 36 mounted respectively on the adjacent ends of the spindle S and the arbor A. The two sprockets 35 and 36 are keyed respectively on the spindle S and the arbor A by key devices 37, and the outwardly projecting teeth of the two sprockets are operatively associated with each other by means such as a continuous chain device 38 so as to be drivingly interconnected.

The coupling 20, in accordance with the present invention, embodies thrust bearing means whereby the endwise thrust applied to the tool 22 in the course of a boring operation or the like may be effectually transmitted from the arbor A to the spindle S, and as will be evident in Fig. 5 of the drawings, such thrust bearing means are enclosed in the space between the adjacent faces of the sprockets 35 and 36. Means are provided for holding such thrust bearing means in an engaged relation, thereby to avoid endwise play of the tool as it is engaged with or disengaged from the work W. Thus, as shown in Figs. 1, 5 and 6, a plurality of retainer bolts 39 are extended through relatively large bores 40 formed in the hubs of the two sprockets 35 and 36 parallel to the longitudinal axes thereof. The heads 41 of the bolts 39 are arranged to engage the exposed end face of one of the sprocket hubs while the other ends of the bolts 39 have compression springs 42 disposed in surrounding relation thereto so as to abut the end face of the other sprocket hub. A washer 43 and a nut 44 on each of the bolts 39 serve to place the springs 42 under compression, and hence the springs 42 and the related bolts 39 serve to urge the two sprockets toward each other, thereby to maintain the thrust bearing means in an engaged relationship.

The thrust bearing means in the present instance are arranged to provide for relative pivotal movement of the shaft S and the arbor A such as would be necessary in the event of angular misalignment of these two members, and also for such lateral displacement of the arbor A relative to the spindle S as may be required by any lateral misalignment of the spindle S with respect to the guide bushing 28. In providing such thrust bearing means, a thrust bearing head 45 is mounted on the lower end of the spindle S so that a downwardly convex bearing surface 46 formed on the head 45 will be disposed within a mounting recess 47 formed in the lower face of the sprocket 35. The downwardly convex face 46 is arranged so as to be concentric with the axis of the spindle S, and this bearing surface is arranged to bear against an upwardly concave bearing surface 48 formed in a bearing block 49 which forms part of a thrust bearing assembly 50. The relationship of such convex and concave bearing surfaces could of course be reversed if desired. The thrust bearing assembly 50 is arranged to permit lateral displacement of the sprocket 36 with respect to the sprocket 35, and to accomplish this purpose, the bearing plate 51 is provided beneath the bearing block 49, and antifriction bearing means are interposed between the plate 51 and the lower surface of the bearing block 49. In the present instance, the antifriction bearing means include a retainer plate 52 which has a plurality of bearing balls 53 mounted therein at spaced positions. The retainer plate 52 is mounted within a recess formed in the lower face of the bearing block 49. The bearing assembly provided by the plate 51, the bearing device 52—53 and the block 49 are assembled within a sheet metal oil-retaining member 55 which is flanged inwardly at 56 at its upper end so as to prevent outward discharge of oil from oil passages 57 of the bearing block 49. This bearing assembly 50 is mounted by a press fit in a recess 58 in the adjacent end of the lower sprocket 36. Hence, even though lateral displacement of the bearing block 49 with respect to the bearing head 45 cannot take place by reason of the engagement of the surfaces 45 and 48, the plate 51 and the sprocket 36 may nevertheless move laterally with respect to the bearing block 49, clearance space 60 being afforded between the side edges of the bearing block 49 and the housing 55.

When, because of lateral or angular misalignment of the spindle S with respect to the axis defined by the guide bushings 28 and 29, it is necessary for the arbor A and the tool to move or swivel with respect to the spindle S, it is desirable that such movement take place without placing objectionable stresses upon the arbor A such as might tend to cause wear of the guide bushings 28 and 29. In accordance with the present invention, this is accomplished by a novel interrelationship of the sprockets 35 and 36 with the chain 38. The chain 38 may, of course, take different forms, but as herein shown, is of the roller type and comprises upper links 62, lower links 63, and intermediate links 64 which are connected by mounting pins 65. Between the lower links 63 and the intermediate links 64, the connecting pins 65 have cylindrical rollers 66 mounted thereon, while cylindrical rollers 67 are mounted on the pins 65 between the intermediate links 64 and the upper links 62. Thus, the chain 38 comprises two parallel runs and the rollers 66 of the lower run of the chain are arranged to engage between the teeth 70 of the lower or driven sprocket 36. Similarly the rollers 67 of the upper run of the chain 38 are arranged to engage between the teeth 71 of the upper or driving sprocket 35. It will be observed that the thickness of the teeth 70 and 71 is in each instance somewhat less than the length of the chain rollers which are engaged therewith, and hence there may be relative movement of the teeth of the sprockets along or longitudinally of the surfaces of the rollers 66 or 67 as the necessity for such movement as may be brought about by misalignment of the spindle S and the arbor A.

As shown in Figs. 7 and 9 of the drawings, the teeth 70 of the driven sprocket 36 are of conventional form so that the rollers 66 of the lower run of the chain 38 are engaged with and between the sloping sides 75 and 76 of the adjacent teeth 70 and are maintained in a predetermined relation to the teeth by such engagement with the two sloping sides 75 and 76. In the driving sprocket 35 of the coupling of this invention, however, the form tooth 71 has been modified so as to avoid undue stresses when the connected elements such as the spindle S and the arbor A are misaligned. In this respect, the coupling of the present invention may be so constructed and arranged as to attain its novel operation in either direction of rotation or drive but as shown in Figs. 1 and 5 to 10, the coupling is particularly adapted for transmitting motion in one direction only, this direction being indicated by the arrows in the various plan views. When the driving sprocket 35 is so rotated, that is, in a clockwise direction as viewed in Fig. 8, the driving force will of course be transmitted to the rollers 67 of the chain by the leading edges of the teeth 71. Thus, the chain will be correspondingly driven in a clockwise direction, and such motion will be transmitted to the teeth 70 of the driven sprocket 36 by engagement of the rollers 66 with the trailing edges 76 of the teeth 70.

In the transmission of rotary motion between the sprockets in the foregoing manner, the presence of absolute alignment of the spindle S and the arbor A will, of course, result in a relatively fixed or stationary relationship of the rollers of the chain 38 with respect to the teeth 70 and 71 of the two sprockets. However, when any of the various forms of misalignment are present, there is necessarily a tendency to produce a compensating movement of at least some of the rollers with respect to the sprocket teeth engaged thereby. In prior couplings of the general character to which this invention relates this action in the presence of misalignment has produced an undesirable reaction between the chain and the teeth of the sprockets which has urged the connected shafts toward a condition of perfect alignment. Thus, where such prior couplings have been used as part of the drive for a drilling or boring tool, such reactive forces have caused undue wear upon their guide means such as the guide bushings 28 and 29 herein shown. Under the present invention, however, the interconnection of chain with the sprockets of the coupling is attained in such a manner as to avoid such objectionable reactive forces.

In the preferred form of the invention herein shown this is accomplished through the provision of teeth of a novel form upon one of the sprockets. Thus as shown in Figs. 8 and 10 of the drawings, the driving sprocket 35 has its power transmitting or leading edges 78 formed to enable transmission of force without the production of objectionable reactive forces such as those hereinabove discussed. In accomplishing such results, the leading or power transmitting edges 78 of the teeth 71 are formed as flat surfaces disposed in a plane, as 79, Fig. 10, this plane 79 being parallel the axis of the sprocket 35. The plane 79 is, however, displaced with respect to such axis of the sprocket 35 so that when a roller 67 moves along the flat edge surface 78, the axis of the roller 67 will move substantially in a plane, as 80, which extends through the axis of the sprocket 35. Thus, when there is angular or lateral misalignment of the coupled shafts, the rollers 66 which engage the teeth 70 of the sprocket 36 may remain in their normal relationship to the teeth 70, while the rollers 67 move as required, either radially of the sprocket 35 and along the flat surfaces 78, as indicated in Fig. 10, or in a direction generally longitudinally of the coupling and along such faces or edges 78. Such movement of the rollers 67 across the flat faces or edges 78 of the teeth 71 may take place without the production of objectionable reactive forces such as would be created if the force transmitting edges were of a sloping form such as the edges 75 or 76 of the teeth 70. It will be observed, of course, the teeth 71, as utilized in the form of the invention shown in Figs. 1 and 5 to 10, have trailing edges 82 which are of the same form as the edges 75 and 76 of the teeth 70, but this does not detract from the advantageous operation of the present device since the edges 82 do not act on the rollers 67 as either positioning or force transmitting surfaces.

Thus, as shown in Fig. 10 of the drawings, the axis A' of the arbor A may be displaced laterally from the axis S' of the spindle S, so as to produce lateral disalignment of these two members, as illustrated in Fig. 4 of the drawings, and the rotative drive will be effectually transmitted without the production of objectionable reactive forces such as those hereinbefore discussed. As such rotative drive takes place, the rollers 67 move freely along the flat surfaces or edges 78 of the teeth 71 in directions generally radial with respect to the axis of the sprocket 35, as indicated by the positions of such rollers 67 in Fig. 10. When the misalignment of the connected shafts is angular in character, as indicated in Fig. 2 of the drawings, the movement of the rollers 67 with relation to the flat or working edges 78 of the teeth 71 is also parallel to the flat faces of the opposed edges 78, but in this instance the movement is centered substantially upon the center of the convex bearing face 46, the rollers 67 moving about such center and generally endwise across the opposed faces or edges 78. In the event that the misalignment of the two coupled shafts is both angular and lateral, as shown in Fig. 3 of the drawings, the movement of the rollers 67 along the flat edges 78 will, of course, be compound or complex in character so as to involve components of endwise movement as well as lateral movement as illustrated in Fig. 10. However, in any of the foregoing instances, the relationship of the shifting or relatively moving parts is such as to avoid objectionable reactive forces which would cause undue wear or stress on the guide means such as the guide bushings 28 and 29.

In Fig. 11 of the drawings, I have illustrated an alternative form of the invention as embodied in a coupling 20A. This embodiment of the invention is in most respects similar to the coupling 20, and similar parts are therefore identified by the same reference characters with the suffix "A" added in each instance. The coupling 20A, however, is arranged to embody thrust bearing means of a different character than the coupling 20, and for this reason the adjacent ends of the sprockets 35A and 36A are formed with flat surfaces 86 and 87 respectively. The flat surface 87 is disposed flush with the end 88 of the arbor AA while the spindle SA is so mounted in the sprocket 35A that its end 89 extends slightly beyond the flat surface 86. With this arrangement a bearing ring 90 is disposed in snugly surrounding relation to the end 89 of the spindle SA, the bearing ring 90 having a flat surface 91 in bearing engagement with the flat surface 86 of the sprocket 35A. The opposite end surface of the bearing ring 90 is rounded as at 92 so that its lower portion engages the flat surface 87 of the sprocket 36A. The rounded surface 92 of the bearing ring 90 enables rocking or angular displacement of the arbor AA with respect to the bearing ring as well as lateral sliding movement of the surface 87 with respect to the bearing ring 90. The springs 42A serve, of course, to maintain the thrust bearing surfaces in proper engagement, and the thrust bearing means enables lateral or angular displacement of the parts in the manner described with respect to the coupling 20. The teeth of the sprockets 35A and 36A are formed and related to the chain 38A in same manner as hereinbefore described in connection with the coupling 20, so that the same advantageous operation is attained. In this respect, however, it is to be observed that the flat edge surfaces 78 may be formed on the teeth of either of the two sprockets so long as such flat surfaces are disposed on the power-transmitting edges of such teeth. Thus, as applied to the driven sprockets 36 or 36A, such flat edges would be formed on the trailing edges of the teeth rather than upon the leading edges as in the driving sprocket 35.

It has been pointed out hereinbefore that the advantageous operation of the coupling of the present invention may also be attained in couplings adapted to transmit rotative drive in either direction, and in Figs. 12 and 13 I have fragmentally illustrated an alternative form of sprocket 35B which may be incorporated in the coupling 20 or 20A to attain this result. While the sprocket 35B may constitute either the driving sprocket or the driven sprocket of a coupling, it is herein illustrated as being the driving sprocket, and it will be observed that the sprocket 35B has a greater spacing of the teeth 71B so that the effective width of the teeth 71B is considerably greater than that of the teeth 71. The teeth 71B are formed with similar but oppositely facing flat edges 78B and 78C on their opposite faces, both such faces or edges 78B and 78C being disposed in the manner hereinbefore described with relation to the edges 78.

When the sprocket 35B is used in a coupling, the cooperating sprocket may take the form of the sprocket 36B shown in Fig. 14, the teeth 70B of this sprocket being arranged to engage the rollers 66B of the claim in substantially the same manner as in Fig. 7. With this arrangement the drive may be transmitted between the two sprockets in either direction, and in either instance the rollers 67B may move along the effective or working edge 78B or 78C in the same manner as hereinbefore described with relation to the coupling 20. Thus, in the event that the sprocket 35B is acting as the driving sprocket and is rotating in a clockwise direction, the edges 78B of the teeth 71B will serve as the driving or working edges, as shown in Fig. 12, while upon reversal of the driving direction the parts will assume the relationship shown in Fig. 13, and the edges 78C of the teeth 71B will serve as the working or driving edges. Hence, the use of sprockets 35B and 36B in either the coupling 20 or 20A enables the resulting coupling to care for the various types of misalignment in the same advantageous manner as the coupling 20 and 20A and such results are attained in either direction of rotation of the parts.

In Figs. 15, 16 and 17, I have illustrated a coupling 20D constituting another embodiment of the invention wherein the requisite movement of the parts is attained in a different manner. The coupling 20D is substantially like the coupling 20, and similar parts are identified by similar reference characters with the suffix D added in each instance. In this coupling the sprocket 35D has its teeth 71D formed so as to adapt the coupling for the efficient transmission of rotation in either direction, and the width and spacing of the teeth of the sprocket 36D must of course conform with the spacing of such teeth 71D. In this form of the invention the chain 38D has its rollers 66D engaged with the teeth of the sprocket 36D in substantially the same manner as the corresponding parts in the coupling 20, but the rollers 67D are arranged with convex surfaces 95 which are arranged to bear against substantially complemental convex edges as 78D and 78E formed on opposite edges of the teeth 71D of the sprocket 35D. Thus any relative rocking movement required between the rollers 67D and the engaged surfaces of the teeth 71D may take place, as will be evident in Fig. 16, while maintaining maximum areas of contact between these parts. In the event of angular misalignment, there will of course be some movement of the chain generally parallel to the axis of the coupling, and during such movement the rollers 67D remain stationary in a longitudinal sense with respect to the teeth 71D, and the required displacement of the chain is attained by virtue of the use of relatively long pins 65D in the run of the chain which is associated with the sprocket 35D. Thus there are clearance spaces 97 between the links 62D and 64D and the opposite ends of the rollers 95 which enable such movement of the parts as required in those cases where angular misalignment is present.

The form of the edge surfaces 78D and 78E of the teeth 71D are arranged so that these concave surfaces extend in the same generally radial directions of the surfaces 78 or the surfaces 78B and 78C, thus enabling the rollers 67D to roll in substantial radial directions along such teeth when this is required by the presence of lateral misalignment. The provision of such surfaces 78D and 78E on opposite sides of the teeth 71D serves of course to enable the coupling 20D to efficiently transmit rotary motion in either direction, but it will be evident that the teeth 71D might be formed with but one generally radial edge surface 78D, in which case the coupling would be adapted for one-direction operation.

From the foregoing description it will be evident that the present invention enables efficient transmission of rotary motion to be attained between shafts which are coupled in end to end relation, such efficient power transmission being attained even though various types of misalignment of the two shafts may be present. Moreover, such transmission of rotary motion is attained by the present invention in such a manner that objectionable lateral forces on the shafts are avoided, and hence the coupling of the present invention promotes long wear of the associated mechanism, as well as accuracy of work produced through the use of machines embodying such couplings.

Thus, while I have illustrated and described selected embodiments of my invention, it is to be understood that these are capable of variation and modification and I therefore do not wish to be limited to the precise details set forth but desire to avail myself of such changes and alterations as fall within the purview of the following claims.

I claim:

1. In a rotary driving coupling, a driving member and a substantially aligned driven member, driving and driven sprockets fixed on adjacent ends of said driving and driven members respectively, each of said sprockets having teeth formed thereon, thrust bearing means interposed between said driving and driven members and arranged to enable relative pivotal and lateral shifting of said members, spring means acting between said sprocket members to maintain said thrust bearing means in firm engagement, an endless chain member having two parallel interconnected runs of chain each having rollers and the rollers of one of such runs having convex outer bearing surfaces, said chain member surrounding both of said sprockets and having the rollers thereof engaging the teeth thereof so as to transmit rotary motion from said driving member to said driven member, the one of said sprockets which is engaged by the convex surfaced rollers having the teeth thereof formed with substantially complemental concave side surfaces for engagement by such convex rollers and against which such convex rollers may bear and along which such rollers may shift radially with respect to said sprockets in the course of rotary movement of such sprockets.

2. In a rotary driving coupling, a driving member and a substantially aligned driven member, driving and driven sprockets fixed on adjacent ends of said driving and driven members respectively, each of said sprockets having teeth formed thereon, thrust bearing means interposed between said driving and driven members and arranged to enable relative pivotal and lateral shifting of said members, spring means acting between said sprocket members to maintain said thrust bearing means in firm engagement, an endless chain member surrounding both of said sprockets and having rollers engaging the teeth thereof so as to transmit rotary motion from said driving member to said driven member, at least certain of said rollers being formed with convex outer surfaces, and at least one of said sprockets having the teeth thereof formed with concave side surfaces thereon for driving engagement with the convex rollers of said chain member, said convex rollers being mounted for limited shifting movement relative to the other elements of the chain member in a direction parallel to the axes of such convex rollers.

3. In a rotary driving coupling, a driving member and a substantially aligned driven member, driving and driven sprockets fixed respectively on adjacent ends of said driving and driven members and having an equal number of equally spaced teeth on each of said sprockets, an endless chain member surrounding both of said sprockets and having transverse roller elements with roller surfaces of predetermined form in force-transmitting engagement with the teeth of both of said sprockets, the teeth of at least one of said sprockets having at least one side surface of each tooth formed with a driving surface engaged by the adjacent roller element of said chain and extended in a direction parallel to a plane passing through the axis of said adjacent roller element and said sprocket upon which such tooth is formed and displaced laterally from said plane a distance equal to the radius of said roller element, thereby causing the engaging roller in rolling along said side surface to move radially with respect to the axis of the sprocket upon which such tooth is formed.

BURR W. MANTLE.

REFERENCES CITED

The following references are of record in the file of this patent:

UNITED STATES PATENTS

| Number | Name | Date |
| --- | --- | --- |
| Re. 20,329 | Lee | Apr. 13, 1927 |
| 527,632 | Verity | Oct. 16, 1894 |
| 533,912 | Moise | Feb. 12, 1895 |
| 564,830 | Monks | July 28, 1896 |
| 1,400,063 | Hinton | Dec. 13, 1921 |
| 1,513,944 | Stephenson | Nov. 4, 1924 |
| 1,586,880 | Degener | June 1, 1926 |
| 1,808,369 | Monroe | June 2, 1931 |
| 1,943,791 | Gallamore | Jan. 16, 1934 |
| 1,956,145 | Klaucke | July 3, 1934 |
| 2,227,333 | Campbell | Dec. 31, 1940 |

FOREIGN PATENTS

| Number | Country | Date |
| --- | --- | --- |
| 110,655 | Great Britain | 1917 |
| 115,451 | Great Britain | May 16, 1918 |